(12) United States Patent
Natanzon

(10) Patent No.: US 12,253,917 B2
(45) Date of Patent: Mar. 18, 2025

(54) METHOD AND SYSTEM FOR CONTINUOUS DATA PROTECTION

(71) Applicant: HUAWEI TECHNOLOGIES CO., LTD., Shenzhen (CN)

(72) Inventor: Assaf Natanzon, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/339,090

(22) Filed: Jun. 21, 2023

(65) Prior Publication Data
US 2023/0333946 A1 Oct. 19, 2023

Related U.S. Application Data

(63) Continuation of application No. PCT/EP2020/087362, filed on Dec. 21, 2020.

(51) Int. Cl.
G06F 11/14 (2006.01)
(52) U.S. Cl.
CPC ...... G06F 11/1469 (2013.01); G06F 11/1471 (2013.01)
(58) Field of Classification Search
CPC ............. G06F 11/1469; G06F 11/1471; G06F 11/1446; G06F 11/2094; G06F 11/2097
See application file for complete search history.

(56) References Cited

U.S. PATENT DOCUMENTS 10,353,603 B1 * 7/2019 Baruch ................. G06F 3/0619
2019/0163765 A1 * 5/2019 Byun ....................... G06F 11/14

OTHER PUBLICATIONS

Lu et al., "An Incremental File System Consistency Checker for Block-Level CDP Systems," Symposium on Reliable Distributed Systems, pp. 157-162, Institute of Electrical and Electronics Engineers, New York, New York (Oct. 2008).

* cited by examiner

Primary Examiner — Masud K Khan
(74) Attorney, Agent, or Firm — Leydig, Voit & Mayer, Ltd.

(57) ABSTRACT

A method of continuous data protection (CDP) is provided. The method includes sending, by a splitter, block I/O write data from a computing system to a primary volume and to a CDP appliance. The method further includes, recording, by a file system tracker communicatively coupled with the splitter, a log of meta data operations made to files in a file system of the primary volume and sending the log to the CDP appliance. The method further includes, recording, by the CDP appliance, the block I/O write data in a journal and a secondary volume, and recording the log of meta data operations made to files in the file system of the primary volume in a continuous catalog.

12 Claims, 2 Drawing Sheets

METHOD AND SYSTEM FOR CONTINUOUS DATA PROTECTION

CROSS-REFERENCE TO RELATED APPLICATIONS

This application is a continuation of International Application No. PCT/EP2020/087362, filed on Dec. 21, 2020, the disclosure of which is hereby incorporated by reference in its entirety.

TECHNICAL FIELD

The present disclosure relates generally to the field of data protection and backup; and more specifically, to methods and systems for continuous data protection.

BACKGROUND

In this data-driven world, a vast amount of data is being generated and stored globally, on a regular basis. For example, social networks, internet of things, scientific experiments, commercial services, industrial services, banking services, business interactions, and the like, play a vital role in generating said data. In such instance, data backup becomes very important to ensure data protection as the data can become easily lost or get corrupted on account of disruptive events such as, system failures, power hazards, cyberattacks, natural disasters, communication failures, and the like. Presently, various data protection techniques are being employed for the data backup.

However, existing data protection techniques are associated with several limitations. Firstly, the existing data protection techniques provide only a limited number of points in time for the data backup associated with any data, such as a file. For example, in a snapshot-based data protection technique, snapshots (i.e. backup data images) are generated temporarily (i.e. eventually needs to be deleted), and since such snapshots consume considerable space they are generated in periodic manner, i.e. in a certain time interval. This results in creating the limited number of points in time available for the data backup associated with the file. Moreover, generating said snapshots are expensive, and their generation and deletion require considerable computational resources. The snapshot-based data protection technique requires a huge backup time when difference between two consecutive snapshots is considerable, for example between 15 minutes to several hours. This also leads to a considerable recovery point objective. In the snapshot-based data protection technique, when snapshots are mounted on an array to be read by a backup server, the snapshots reduce bandwidth provided by the array to production workloads. In another example, a continuous data protection (CDP) technique, which employs a file backup catalog, is also inefficient in terms of providing backup to the data to any point in time. Typically, a conventional CDP technique is implemented by using a splitter and a CDP appliance. The conventional CDP technique mainly works in a very similar way to the aforesaid snapshot-based data protection technique. Moreover, the conventional CDP technique requires considerable bandwidth, sensitive to bandwidth fluctuations, has difficulty in implementing data reduction (such as, a compression and a wide-area network (WAN) deduplication) using advance algorithm, requires data in a native format, prone to significant latency in writes with a synchronous splitter, requires full scanning of host storage with an asynchronous splitter and so forth. Additionally, the conventional CDP technique is prone to overloading protection target due to random input/output (I/O) data received by the protection target. Secondly, the existing data protection techniques require considerable computational resources in parsing a file system of a primary volume for changes in files of the file system required for data backup. Moreover, the conventional CDP technique is based on a block level data protection, wherein it does not provide ability to search for changed files to any point in time.

Therefore, in light of the foregoing discussion, there exists a need to overcome the aforementioned drawbacks associated with existing data protection or backup techniques.

SUMMARY

The present disclosure seeks to provide improved method and system for continuous data protection. The present disclosure seeks to provide a solution to the existing problems of limited number of points in time available for data backup, requirement of considerable computational resources for data backup, and limitation to a file system level data protection. An aim of the present disclosure is to provide a solution that overcomes at least partially the problems encountered in prior art and provide improved method and system for continuous data protection by employing continuous cataloguing, which provides data backup for required number of points in time, with minimal computational resource and to a block level data protection.

The object of the present disclosure is achieved by the solutions provided in the enclosed independent claims. Advantageous implementations of the present disclosure are further defined in the dependent claims.

In an aspect, the present disclosure provides a method of continuous data protection (CDP). The method comprises: sending, by a splitter, block input/output (I/O) write data from a computing system to a primary volume and to a CDP appliance; recording, by a file system tracker communicatively coupled with the splitter, a log of meta data operations made to files in a file system of the primary volume and sending the log to the CDP appliance; recording, by the CDP appliance, the block I/O write data in a journal and a secondary volume, and recording the log of meta data operations made to files in the file system of the primary volume in a continuous catalog.

The method enables a user to perform or execute data backup (namely, restore or recover) for a data, such as a file, to any required point in time. Herein, the file system tracker continuously records the log of meta data operations made to the files in the continuous catalog. In such instance, the continuous catalog maintains up-to-date information about the state of any file at any point in time, i.e. when any file is subjected to any operation or change. Typically, the CDP appliance recovers the file to a point in time, the file has the state, by searching the state of the file at that point in time in the continuous catalog. In this regard, the method facilitates a near zero recovery point objective. In this way, the method provides data security in case of loss of data on account of any disruptive events. The method enables minimal computational resources in parsing the file system of the primary volume for changes in files of the file system required for the data backup. This may due to the fact that there is no need to manage snapshots for data protection unlike in existing snapshot-based data protection technique. The method is well suited for both a file system level data protection and a block level data protection. The method can be suitably implemented with computing system without making changes to architecture of the computing system.

In an implementation form, the log of meta data operations made to files in the file system of the primary volume comprises a list of files exposed to operations and a log of meta data operations made to each file in the list.

By virtue of the log of meta data operations made to the files, i.e. the files that are subjected or exposed to any operation and the operations made to such files, necessary information required for the backup of the files are precisely identified and maintained. This facilitates the CDP appliance to perform backup based on the list of files and corresponding log of meta data operations, and which in turn lessens computational burden.

In an implementation form, the method further comprises cleaning the log in the file system tracker each time after sending the log of meta data operations made to files in the file system of the primary volume to the CDP appliance.

By virtue of the cleaning, a likelihood of sending redundant (old) information of the log along with a new information of the log to the CDP appliance is considerably eliminated. This also helps in efficiently managing storage space associated with the file system tracker.

In an implementation form, the continuous catalog is searchable for a state of a file at a point in time (PIT), the state of the file being defined by what operations have been made to the file by the PIT, based on a name and attributes of the file.

The continuous catalog is searchable for the state of the file at the PIT based on the name and attributes of the file, which makes the search accurate. In other words, by knowing the state of the file (for example, a last operation made to the file) at the PIT, it can be accurately and precisely known whether or not the file is in a consistent state, at which the file needs to be recovered or restored (i.e. based on the last operation made to the file).

In an implementation form, the method further comprises: searching, by the CDP appliance on request from the computing system to recover a file to a state, the continuous catalog for a PIT the file has the state; rolling the journal back to the PIT, mounting the file system in the secondary volume at the PIT and retrieving from the secondary volume the state of the file at the PIT; and restoring the file to the state in the primary volume.

Notably, a conventional CDP technique includes a CDP appliance in conjunction with a journal and a secondary volume. However, the CDP technique of the present disclosure also includes the file system tracker and the continuous catalog. In operation, the continuous catalog enables in searching the PIT the file having the state to recover the file to the state. This allows a user to reliably recover (namely, restore) a required file having a specific state at a specific PIT. In other words, the CDP technique of the present disclosure provides improved searchability of separate files which are subjected to changes, and thereafter recovery of such files.

In an implementation form, the primary volume is located in a primary storage while the journal, the continuous catalog and the secondary volume are located in a secondary storage.

This implementation enables remote replication of data (by the CDP appliance being implemented as a remote CDP appliance) for continuous data protection as the primary volume being located onsite, and the secondary volume being located offsite (as a remote storage).

In an implementation form, the primary volume, the journal, the continuous catalog, and the secondary volume are located in the same storage.

This implementation enables local replication of data (by the CDP appliance being implemented as a local CDP appliance) for continuous data protection as the primary volume and the secondary volume are located onsite.

In another aspect, the present disclosure provides a system for continuous data protection (CDP). The system comprises: a splitter configured for sending block I/O write data from a computing system to a primary volume and to a CDP appliance, and a file system tracker communicatively coupled with the splitter and configured for recording a log of meta data operations made to files in a file system of the primary volume and sending the log to the CDP appliance, wherein the CDP appliance is configured for recording the block I/O write data in a journal and a secondary volume, and recording the log of meta data operations made to files in the file system of the primary volume in a continuous catalog.

The system enables a user to perform or execute backup (namely, restore or recover) for a data, such as a file, to any required point in time. Herein, the file system tracker continuously records the log of meta data operations made to the files in the continuous catalog. In such instance, the continuous catalog maintains up-to-date information about the state of any file at any point in time, i.e. when any file is subjected to any operation or change. Typically, the CDP appliance recovers the file to a point in time the file has the state by searching the state of the file at that point in time in the continuous catalog. In this regard, the system facilitates a near zero recovery point objective. In this way, the system provides data security in case of loss of data on account of any disruptive events. The system requires minimal computational resources in parsing the file system of the primary volume for changes in files of the file system required for the data backup. This may due to the fact that there is no need to manage snapshots for data protection unlike in existing snapshot-based data protection technique. The system is robust, and can be suitably implemented with computing system without making changes to architecture of the computing system. The system of this aspect achieves all the advantages and effects of the method.

In an implementation form, the log of meta data operations made to files in the file system of the primary volume comprises a list of files exposed to operations and a log of meta data operations made to each file in the list.

In an implementation form, the file system tracker is configured for cleaning the log each time after sending the log of meta data operations made to files in the file system of the primary volume to the CDP appliance.

In an implementation form, the continuous catalog is searchable for a state of a file at a point in time (PIT), the state of the file being defined by what operations have been made to the file by the PIT, based on a name and attributes of the file.

In an implementation form, on request from the computing system to recover a file to a state, the CDP appliance is configured for: searching the continuous catalog for a PIT the file has the state, rolling the journal back to the PIT, mounting the file system in the secondary volume at the PIT, retrieving from the secondary volume the state of the file at the PIT, and restoring the file to the state in the primary volume.

In an implementation form, the primary volume is located in a primary storage while the journal, the continuous catalog and the secondary volume are located in a secondary storage.

In an implementation form, the primary volume, the journal, the continuous catalog, and the secondary volume are located in the same storage.

Various implementation forms of the system achieve all the advantages and effects of the corresponding implementation forms of the method.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
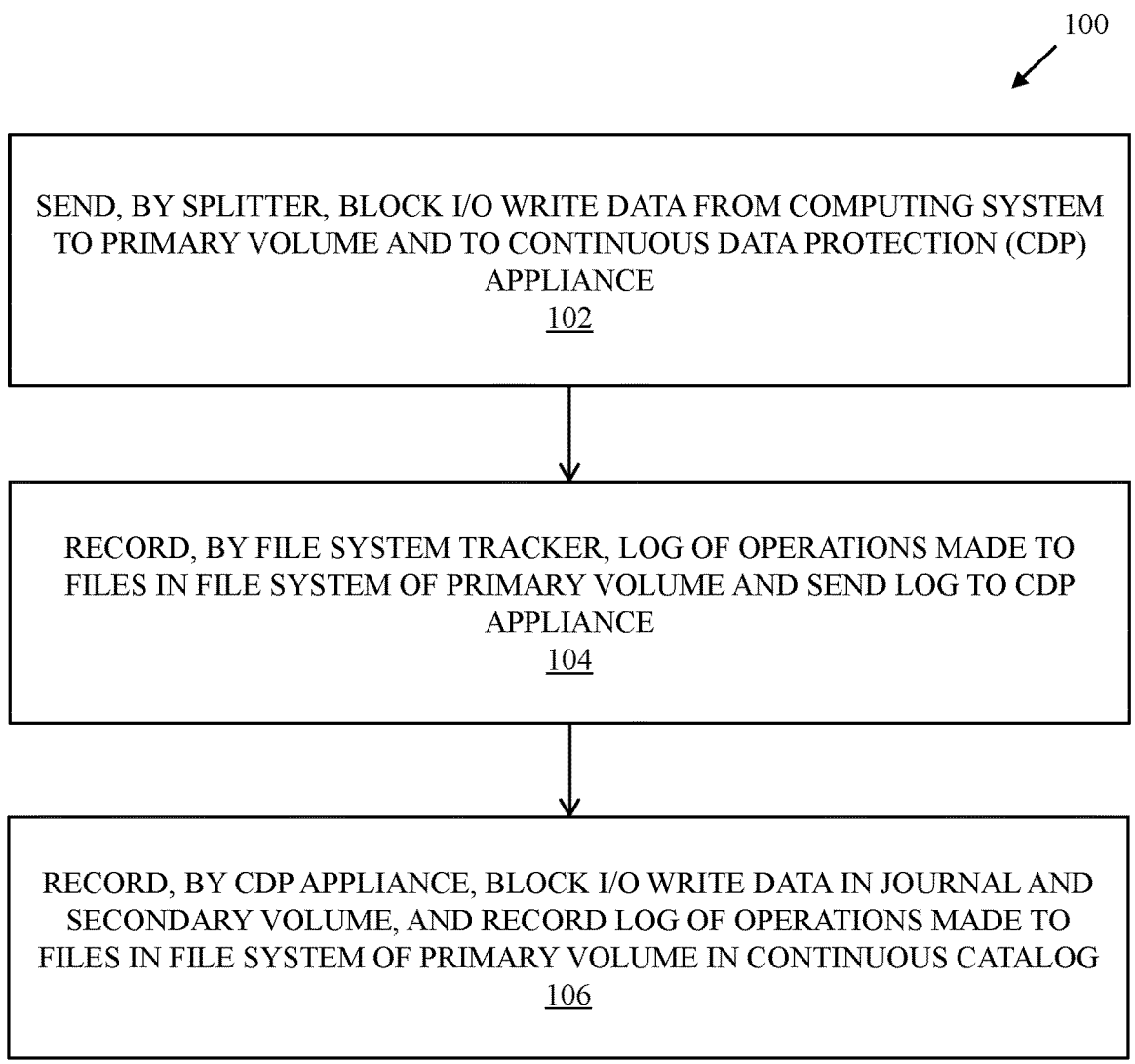
FIG. 1 illustrates a flowchart of a method of continuous data protection (CDP), in accordance with an embodiment of the present disclosure.

Referring to FIG. 1, illustrated is a flowchart of a method of continuous data protection (CDP), in accordance with an embodiment of the present disclosure. As shown, the method 100 includes steps 102, 104, and 106.

Throughout the present disclosure, the term "continuous data protection" refers to continuous backup of data whenever a change is made to said data. Herein, the continuous backup involves automatically saving a copy of the data with respect to every change made to the data. This essentially captures each version of the data that a user (of the computing system) saves in the computing system. Typically, the CDP runs as a service (namely, a session) on the computing system that captures the change(s) made to the data to a separate storage.

Existing data protection techniques offer a limited number of points in time for backup (namely, recovery points). In such a case, when a data loss occurs on account of a disruptive events, the data backup is available only up to last available recovery point. It will be appreciated that the method 100 for CDP allows a user to restore (or recover) the data to a required point in time (i.e. a point in time when a last change or a corresponding last operation was made to the data), unlike the existing data protection technique that offer restoration to a limited points in time. The method 100 also allows the user to restore the data to any point in time corresponding to any operation that was made to the data. In simple words, the method 100 allows the user to restore the data to a point in time corresponding to operations that were made to the data, which will be explained in greater detail herein later. It will also be appreciated that the method 100 for CDP facilitates a near zero recovery point objective (RPO). The term "recovery point objective" refers to a maximum period in which the data might be lost (such as, from a service) due to any disruptive event.

At step 102, the method 100 comprises sending, by a splitter, block input/output (I/O) write data from a computing system to a primary volume and to a CDP appliance. In other words, at step 102, a duplicated copy of the block I/O write data is sent, by the splitter, from the computing system to the primary volume and to the CDP appliance. In an embodiment, the splitter is deployed at the computing system to obtain the block I/O write data from the computing system. The splitter splits the obtained block I/O write data into two exact replicas of the obtained block I/O write data, wherein one copy is sent to the primary volume while another copy is sent to the CDP appliance. It will be appreciated that with a block I/O write interception, data is intercepted at a block device layer, while file systems are typically a structure over such block device layer.

Throughout the present disclosure, the term "CDP appliance" refers to hardware, software, firmware or a combination of these for providing the CDP services for a computing system. The CDP appliance may also be referred to as a protection target appliance, a data mover, a replication appliance, a protection appliance, a CDP appliance. The CDP appliance manages data replication for a data storage. Typically, the CDP appliance enables in achieving the near zero RPO, i.e. the data backup is continuously managed by the CDP appliance, allowing a very low (such as, a few seconds) RPO.

In an embodiment, the CDP appliance is a local CDP appliance, i.e. when configured to manage a local replication of data for providing the CDP services for a computing system (for example, a host computing system). In another embodiment, the CDP appliance is a remote CDP appliance, when configured to manage a replication of data for providing the CDP services to a computing system remotely.

In an embodiment, the CDP appliance is located in a secondary storage. In another embodiment, the CDP appliance is located outside of the secondary storage. For example, data to be protected is copied to the secondary storage which may be replicated to a remote storage (such as, a cloud storage). It will be appreciated that such replication of the data could be done for at least one of: archiving wherein a copy of the data would be archived in the cloud storage for very long periods of time, tiering wherein portions of data that are rarely-used can be offloaded to a cheaper cloud storage to vacate space for frequently used data on the secondary storage, data recovery in case of a disaster.

Throughout the present disclosure, the term "splitter" refers to an input/output (I/O) filter software (namely, a driver) that is configured to sit on a data path followed by the block I/O write data. In other words, the block I/O write data is streamed through the splitter which represents data changes made to file(s). It will be appreciated that the splitter could be installed anywhere in the data path. In an embodiment, the splitter is installed inside one of: a bare-metal server operating system (OS) kernel when all servers are protected, a guest virtual machine (VM) kernel when the guest VM is protected, a hypervisor kernel, a storage array intercepting all the I/O's at their endpoint. In an embodiment, when the splitter is installed inside the hypervisor kernel, the splitter intercepts the block I/O write data pertaining to all virtual disk drives (namely, vDisks) of the VM. In an embodiment, when the splitter is installed inside the storage array, the splitter intercepts the block I/O write data from endpoints of the storage array. Notably, the splitter intercepts the block I/O write data that is received from the computing system and sends said data to the primary volume and to the CDP appliance. In an example, the computing system includes the splitter, which is communicably coupled (in wired or wireless manner) to the primary volume (for example, associated with the computing system) and the CDP appliance.

In an embodiment, a protocol between the splitter and the CDP appliance is synchronous. In such a case, the splitter waits for an acknowledgement after sending the copy of the block I/O write data to the CDP appliance. After receiving the acknowledgement, the splitter continue to send further copy of the block I/O write data to the CDP appliance. In another embodiment, a protocol between the splitter and the CDP appliance is asynchronous. In such case, the splitter accumulates copy of the block I/O write data and sends the copies of the block I/O write data (in form of packages of objects) periodically (such as, after every 5 seconds) to the CDP appliance. In that case, the splitter sends the copy of the block I/O write data without waiting for any acknowledgement(s).

Throughout the present disclosure, the term "block I/O write data" refers to a unit of data to be written a at block level. As we know, performing block I/O means that an application or a file system is sending blocks to a storage (or disk drive) to be written or asking for blocks using a logical block address (LBA). Therefore, the term block I/O write data may be referred to the unit of data associated with a file. It would be apparent that creating the file would be associated with the operations performed on the file, and accordingly the block I/O write data for the file would change based on operations performed on the file. In other words, the block I/O write data may be considered as a stream of data passing through the splitter.

Throughout the present disclosure, the term "computing system" refers to hardware, software, firmware or a combination of these configured to perform at least one computing task based upon input from the user. Examples of the computing system may include, but are not limited to, a computer, a virtual machine (VM). In an embodiment, when the computing system is implemented as the VM, a hypervisor (namely, a VM monitor) is utilized to create and run the VM.

Throughout the present disclosure, the term "primary volume" refers to a storage area which is directly accessible to the computing system. Typically, the primary volume is a data storage associated with the computing system. Further, the primary volume is configured to store the block I/O write data therein.

At step 104, the method 100 comprises recording, by a file system tracker communicatively coupled with the splitter, a log of meta data operations made to files in a file system of the primary volume and sending the log to the CDP appliance.

Throughout the present disclosure, the term "file system tracker" refers to software or firmware for recording (namely, tracking) the log of meta data operations made to files in the file system of the primary volume. The file system tracker records meta data of the changes made to the file(s). Further, the term "file system" refers to a data structure used for organizing and storing files on a storage device. Examples of the file system may include, but are not limited to, a File Allocation Table (FAT) file system, a New Technology File System (NTFS), a Hierarchical File System (HFS), a Unix File System (UFS), a Virtual Machine File System (VMFS), an Extended (EXT) file system. Further, the term "file" refers to a resource for storing information in the computing system. The file may be designed to store an image, a text, a video, an executable program, and the like.

It will be appreciated that the file system tracker accurately tracks all the changes in the primary volumes, particularly, changes to the files in the file system, and precisely maintains consistent point in time data images in form of the log with respect to the changes made to the files. This facilitates the CDP appliance to restore a file to any required point in time, which will be explained in greater detail herein later.

Further, the term "log of meta data operations" refers to a record comprising metadata regarding files that are exposed to change(s) with respect to operation(s). Such change(s) represents modifications performed by user(s) in the files at a given point in time. It will be appreciated that the file system tracker accordingly records the log in real time whenever any change is made to any file. This facilitates in tracking changes in a continuous manner, and eventually sending up-to-date log of meta data operations (with respect to the files) to the CDP appliance. Furthermore, in an example, the operations may include but are not limited to, open a file, close a file, create a file, delete a file, write to a file, flush a file, read from a file, move a file.

In an embodiment, the log of meta data operations made to files in the file system of the primary volume comprises a list of files exposed to operations and a log of meta data meta data operations made to each file in the list. Notably, the file system tracker is configured to collect only the log of meta data meta data operations, not the data associated with such operations, for example a write operation, a read operation, and the like.

According to an embodiment, the file system tracker is configured to record and maintain the list of files exposed to changes due to the operations, and the log of such meta data operations with respect to each file in said list. In an example, the list of files may comprise three files A1, A2, and A3 exposed to operations, such as closing, moving and deleting the file, respectively. Accordingly, the log of meta data operations may comprise closing the file A1, moving the file A2 and deleting the file A3. It will be appreciated that the files that are exposed to the operations and the log of meta data operations made to such files are accurately known to the CDP appliance. This facilitates the CDP appliance in backing up only those files that are in the log and accordingly requires minimal computational burden.

In an embodiment, the file system tracker (namely, a file system filter driver) sends the log to the CDP appliance via the splitter. Further, the file system tracker may be communicatively coupled with the splitter wirelessly and/or in a wired manner. For example, the file system tracker may be communicatively coupled with the splitter via an internal central processing unit (CPU) and/or a memory communication channel.

In an embodiment, the method 100 further comprises cleaning the log in the file system tracker each time after sending the log of meta data operations made to files in the file system of the primary volume to the CDP appliance.

In this regard, the log in the file system tracker is overwritten after every time instant of sending the log of meta data operations made to files (in the file system of the primary volume) to the CDP appliance. In an embodiment, when the splitter is configured to send the log at a given time instant to the CDP appliance, the splitter reads the list of files that are exposed to the operations and the log of meta data operations made to each file in the list. Thereafter, the file system tracker clears the metadata regarding each file in the list before the log is recorded again. It will be appreciated that said cleaning eliminates likelihood of sending redundant information of the log to the CDP appliance. In other words, sending an old information of the log to the CDP appliance along with a new information of the log could be prevented. Also, cleaning the log in the file system tracker enables in saving data storage space associated with the file system tracker. In an example, at a time instant T1, the log may comprise creating the file B. At a time instant T2, the log may comprise writing to the file B. Herein, the log in the file system tracker is cleaned after sending the log to the CDP appliance, for example, after the time instant T1, i.e. when the log of creating the file B is sent to the CDP appliance. Similarly, the log in the file system tracker would be cleaned after the time instant T2, i.e. when the log of writing to the file B is sent to the CDP appliance.

At step 106, the method 100 comprises recording, by the CDP appliance, the block I/O write data in a journal and a secondary volume, and recording the log of meta data operations made to files in the file system of the primary volume in a continuous catalog. In other words, at step 106, the CDP appliance replicates the block I/O write data in the journal and the secondary volume, and replicates the log in the continuous catalog. In this regard, the CDP appliance is communicatively coupled with the journal, the secondary volume, and the continuous catalog wirelessly and/or in a wired manner. The change(s) made to the files can be aggregated and summarized when sending the log, such as the files that are exposed to the changes are indicated but not locations of the files for such change(s) and number of times the file that have been exposed to the change(s).

Throughout the present disclosure, the term "journal" refers to a database that is used to store the block I/O write data for a plurality of points in time during a CDP session. It will be appreciated that when any file is accidently deleted and/or corrupted from the primary volume, the journal enables to recover the file to any point in time. Typically, during a recovery, the journal entries serve as successive "undo" information, enabling rollback of the secondary volume to the previous points in time. The journal optionally comprises a log of undo operations which allows the journal to roll back the secondary volume to a previous point in time, and/or a log of redo operations which allows the journal to roll back the secondary volume to a forward point in time. In an embodiment, the journal comprises the log of redo operations and a plurality of snapshots of point in time. In order to roll the secondary volume to a requested point in time, the journal restores a latest available snapshot of a previous point in time and apply a plurality of redo operations till the secondary volume is restored to the requested point in time. In an embodiment, the journal is implemented in an object-based storage, wherein each object comprises a set of changes of file(s).

Throughout the present disclosure, the term "secondary volume" refers to a storage area which is indirectly accessible to a computing system. The secondary volume stores replicas of the block I/O write data permanently. Therefore, in case of any disruptive event, when the block I/O write data gets lost or corrupted, the same can be retrieved from the secondary volume for being restored in the primary volume.

Throughout the present disclosure, the term "continuous catalog" refers to a database that include the log of meta data operations made to files in the file system of the primary volume. Typically, the continuous catalog (namely, a global catalog) is configured to store the log (i.e. the list of files and operations made to each file) in an organized (namely, structured) manner, thereby, allowing for easy storage, access (namely, retrieval), updation of the log. Further, the continuous catalog is configured to store the log permanently for the CDP session. In an embodiment, the continuous catalog is based on a search database such as, elastic search.

In an embodiment, the continuous catalog is searchable for a state of a file at a point in time (PIT), the state of the file being defined by what operations have been made to the file by the PIT, based on a name and attributes of the file. In an embodiment, the continuous catalog is answerable to search queries made by the user. For example, the user may provide a query to find last time of saving a file Z before a time period P1. In another example, the user may provide a query to find a list of files that have been changed two days ago in between 2 PM and 4 PM.

In this regard, the file can have a plurality of states for a plurality of points in time from beginning of the CDP session. The CDP appliance is configured to search the continuous catalog for the state of the file at a specific point in time from amongst the plurality of points in time available for the file. It will be appreciated that the system 100 enables a user to have options for access of the backup of the file at any specific (or required) point in time. It will be appreciated that when the continuous catalog is searchable for the state of the file at the PIT based on the name and attributes of the file, the search would be considerably accurate. In other words, by knowing the state of the file at the PIT, it can be accurately and precisely known whether or not the file is in a consistent state, which is not possible with existing data protection technique (such as, snapshot-based data protection technique).

In an embodiment, name of the file is a unique identifier (for example, a string of alphanumeric and special characters) pertaining to the file stored in the file system. Typically, different file systems have different requirement on length of the name of the file and allowed characters within the name of the file. Further, according to an embodiment, the attributes of the file include at least one of: a type of the file (for example, a video file, an audio file, a text file, an executable file, and the like), an identifier (namely, an extension) of the file (for example, a text file having an identifier ".txt", a video file having an identifier ".mp4", and the like), a location of the file, a size of the file, a type of protection to the file, a time and date of operations that have been made to the file (for example, a time and date of creation of the file, a time and date of updation to the file, a time and date of moving the file, and the like). Examples of the state of the file may include, but are not limited to, the file has been opened, the file has been closed, the file has been created, the file has been deleted, the file has been written, the file has been flushed, the file has been read, the file has been moved. In a first example, six months ago, the state of a file C may be such that the file C has been created. One month ago, the state of a file C may be such that the file C has been written. One week ago, the state of a file C may be such that the file C has been moved from its existing location (i.e. to a new location). Three days ago, the state of a file C may be such that the file C has been deleted.

In an embodiment, the method 100 further comprises searching, by the CDP appliance on request from the computing system to recover a file to a state, the continuous catalog for a PIT the file has the state; rolling the journal back to the PIT, mounting the file system in the secondary volume at the PIT and retrieving from the secondary volume the state of the file at the PIT; and restoring the file to the state in the primary volume.

In an embodiment, a user of the computing system initiates a request to recover the file to the state at the PIT. In this regard, the CDP appliance is configured to search the requested file within the continuous catalog for the PIT the requested file has the state. Said search would be based on the name and attributes of the file. Herein, the term "mounting" refers to a process by which the CDP appliance makes the file at the PIT available in the secondary volume for the user to access via the file system. In other words, mounting the file system attaches the file system to the secondary volume at the PIT and makes the secondary volume available for retrieving the state of the file at the PIT. It will be appreciated that by using the continuous catalog the method 100 enables minimal computational resources in parsing the file system of the secondary volume for identifying the state of the file at the PIT.

Referring to the first example, there may be a request from the computing system to recover the file C to a state when the file C has been written (i.e. when the operation of writing to the file C has been performed). In such a case, the CDP appliance is configured to search the continuous catalog for the PIT the file C has said state (i.e. when the writing operation to the file C has been performed). Herein, the CDP appliance is configured to roll back the journal to one month ago and retrieve, from the secondary volume, the state of the file C that was one month ago. Consequently, the file C having the state, it had one month ago, is restored in the primary volume.

According to an embodiment, the CDP appliance of the present disclosure is operable to recover a block device to any point in time. The term "block device" refers to a data storage device that supports reading and optionally, writing data in a range of bytes (namely, fixed-size blocks, sectors, or clusters) of data at a time. In an embodiment, the block device may relate to the primary volume, having the file system capable of storing the plurality of files therein. As explained herein above, the CDP of the present disclosure enables in restoring a file into the primary volume from the secondary volume based on the request of the computing system. Therefore, the recovery of the block device to a point in time, would refer to the recovery of the primary volume, i.e. the plurality of files in the file system of the primary volume, to that point in time. Generally, the data stored in the block devices is stored in a certain file system format. In an embodiment, the block device is a physical data storage device (like a hard disk, or logical units (LU) on a block storage). In another embodiment, the block devices is a virtual data storage device (like, the vDisk of a VMware). Such block devices are used by bare metal servers and VMs.

In an embodiment, the primary volume is located in a primary storage while the journal, the continuous catalog and the secondary volume are located in a secondary storage. In this regard, the primary volume is located on-site (physically near to the computing system or is a part of the host computing system), and the secondary volume is located off-site (physically distant such, as a remote storage from the computing system). In such a case, a remote replication of data is optionally performed, by the CDP appliance (when being implemented as the remote CDP appliance) for the secondary volume. In such a case, the data is restored, by the remote CDP appliance, to the primary volume.

The term "primary storage" refers to memory that is directly associated with the computing system to handle a live data (for example, a file in the computing system upon which operation(s) is/are being carried out). The primary storage may also be referred to as "main memory" or "internal memory" or "prime memory". Examples of the primary storage may include, but are not limited to, a hard disk or storage array of the computing system. Typically, the computing system mentioned herein referred to a host computing device.

The term "secondary storage" refers to a memory that is directly or indirectly accessed by the computing system. The secondary storage is a storage array that is used for storing files or for file backup. The secondary storage may be on-site or off-site with reset to the computing system. In an embodiment, the secondary storage is implemented as a remote storage. The term "remote storage" refers to an off-site storage that is physically distant from the computing system. In an example, the remote storage may be a hard disk of a remote computing device, or a cloud-based storage. In another example, the primary storage and the secondary storage may be referred to the two different storage sections of the same hard disk (for example, in the on-site scenario), amongst which the primary storage typically deals with the live data, whereas the secondary storage deals with stored/ backup data. Examples of the secondary storage may include, but are not limited to, an electronic storage device, a magnetic storage device, an optical storage device, an electromagnetic storage device, a semiconductor storage device, a portable computer diskette, a hard disk, a memory stick, an arrangement of servers (for example, cloud servers).

In an embodiment, the primary volume, the journal, the continuous catalog, and the secondary volume are located in the same storage. In this regard, the primary volume, the journal, the continuous catalog, and the secondary volume share a common storage. In this regard, the primary volume and the secondary volume are located onsite. In such a case, a local replication of data is optionally performed, by the CDP appliance (when being implemented as the local CDP appliance) for the secondary volume. In such a case, the data is restored, by the local CDP appliance, to the primary volume.

The steps 102 to 106 are only illustrative and other alternatives can also be provided where one or more steps are added, one or more steps are removed, or one or more steps are provided in a different sequence without departing from the scope of the claims herein.

Figure 2:
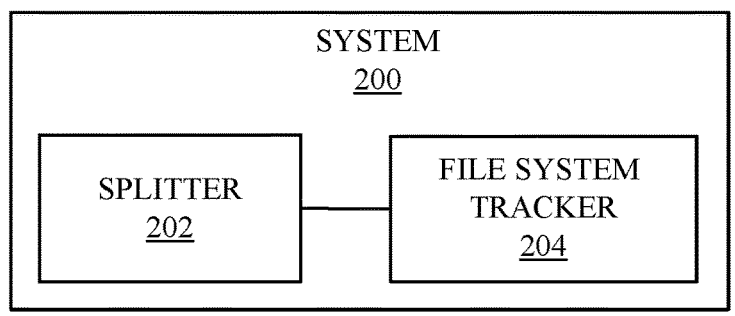
FIG. 2 is a block diagram of a system for continuous data protection, in accordance with an embodiment of the present disclosure.

FIG. 2 illustrates a block diagram a system 200 for continuous data protection, in accordance with an embodiment of the present disclosure. Typically, the system 200 relates to a computing system operable to perform the continuous data protection. The system 200 may be referred to hardware, software, firmware or a combination of these configured to perform the continuous data protection. As shown, the system 200 comprises a splitter 202 and a file system tracker 204 communicatively coupled with the splitter 202. The system 200 of FIG. 2 should be read in line with the method 100 of FIG. 1, i.e. the splitter and the file system tracker explained in conjunction with FIG. 1 are similar to the splitter 202 and the file system tracker 204 of the system 200, as shown in FIG. 2. In other words, the system 200 is operable to perform the steps 102-106 of the method 100 for the continuous data protection.

Figure 3:
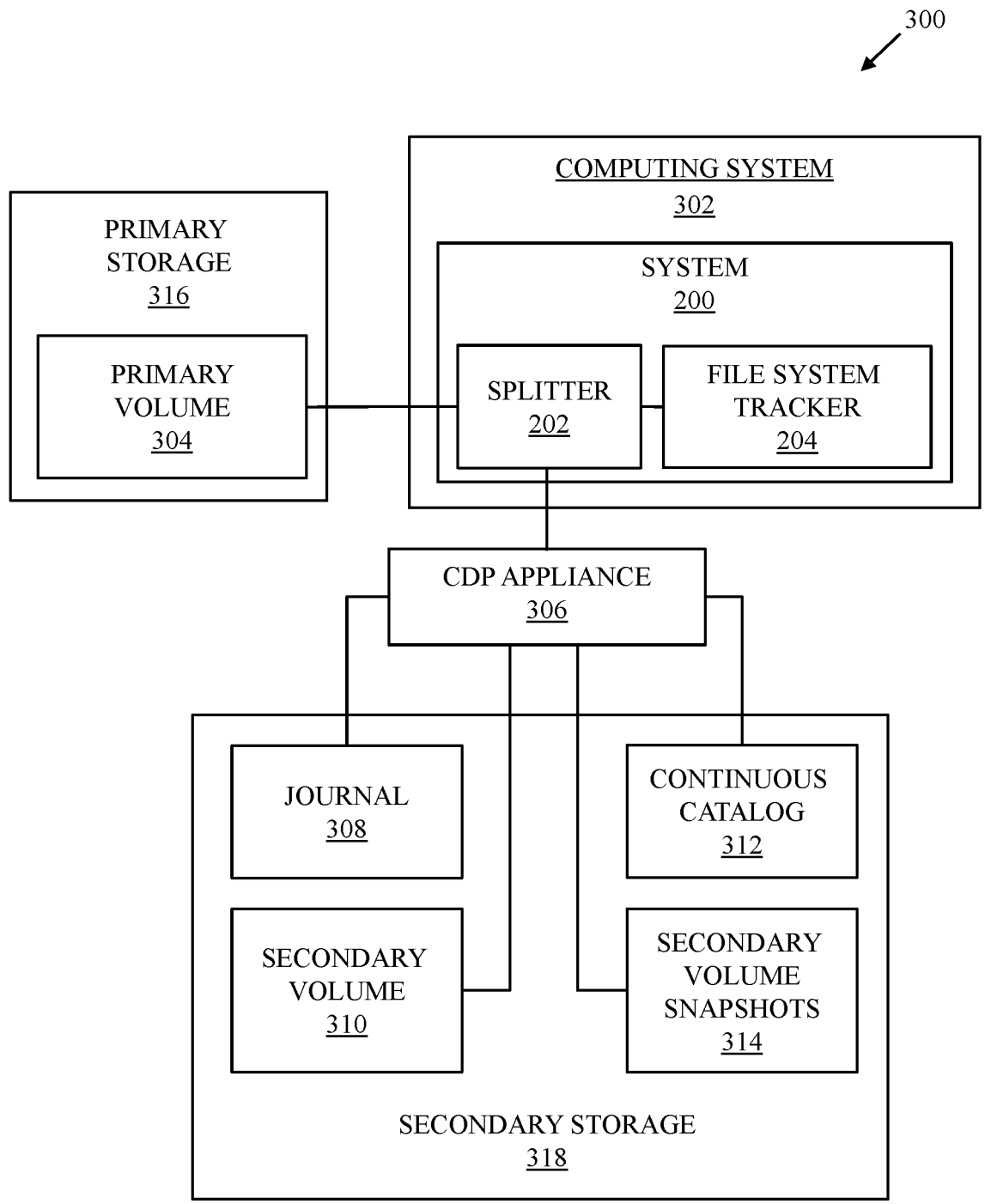
FIG. 3 is a block diagram depicting an exemplary environment for implementing the continuous data protection, in accordance with an embodiment of the present disclosure.

It will be apparent that the system 200 may be operatively coupled to other components, such as a primary volume and a CDP appliance (as shown in FIG. 3), for implementing the continuous data protection. Notably, the splitter 202 is configured for sending block I/O write data to the primary volume and to the CDP appliance. The file system tracker 204 is configured for recording a log of meta data operations made to files in a file system of the primary volume and sending the log to the CDP appliance. The CDP appliance is configured for recording the block I/O write data in a journal and a secondary volume, and recording the log of meta data operations made to files in the file system of the primary volume in a continuous catalog.

The system 200 enables a user to perform data backup of a file to any point in time. Herein, the file system tracker 204 continuously records the log of meta data operations made to the files in a continuous catalog. In such a case, the continuous catalog maintains up-to-date information about the state of any file at any point in time. This facilitates the CDP appliance to recover the file to a point in time the file has the state by searching the state of the file at the point in time in the continuous catalog. In this regard, the system 200 facilitates a near zero recovery point objective. The system 200 requires minimal computational resources in parsing the file system of the primary volume for changes in files of the file system required for backup. The system 200 is robust, and can be implemented and used reliably in real-world applications.

FIG. 3 illustrates a block diagram depicting an exemplary environment for implementing the continuous data protection, in accordance with an embodiment of the present disclosure. With reference to FIG. 3, there is shown an exemplary environment 300 in which a computing system 302 comprises the system 200. Herein, the splitter 202 of the system 200 is communicatively coupled with a primary volume 304 and with a CDP appliance 306. The splitter 202 is configured for sending block I/O write data from the computing system 302 to the primary volume 304 and to the CDP appliance 306. The file system tracker 204 of the system 200 is configured for recording a log of meta data operations made to files in a file system of the primary volume 304 and sending the log to the CDP appliance 306. Further, the CDP appliance 306 is configured for recording the block I/O write data in a journal 308, a secondary volume 310, and optionally secondary volume snapshots 314, and recording the log of meta data operations made to files in the file system of the primary volume in a continuous catalog 312. In this regard, the CDP appliance 306 is communicatively coupled with the journal 308, the secondary volume 310, and the continuous catalog 312. The primary volume 304 is shown located in a primary storage 316 while the journal 308, the continuous catalog 312, the secondary volume 310, and the secondary volume snapshots 314 are located in a secondary storage 318.

Various embodiments, operations, and variants disclosed above, with respect to the method 100, apply mutatis mutandis to the system 200.

According to an embodiment of the system 200, the log of meta data operations made to files in the file system of the primary volume 304 comprises a list of files exposed to operations and a log of meta data meta data operations made to each file in the list. It will be appreciated that the continuous catalog works on a file system level, whereas the journal and the secondary volume works at a block level.

According to an embodiment of the system 200, the file system tracker 204 is configured for cleaning the log each time after sending the log of meta data operations made to files in the file system of the primary volume 304 to the CDP appliance 306. In this regard, the log in the file system tracker 204 is overwritten after every time instant of sending the log of meta data operations made to files in the file system of the primary volume 304 to the CDP appliance 306. It will be appreciated that said cleaning eliminates likelihood of sending redundant information of the log to the CDP appliance 306.

According to an embodiment of the system 200, the continuous catalog 312 is searchable for a state of a file at a point in time (PIT), the state of the file being defined by what operations have been made to the file by the PIT, based on a name and attributes of the file. When the continuous catalog 312 is searchable for the state of the file at the PIT based on the name and attributes of the file, the search would be accurate. In other words, by knowing the state of the file at the PIT, it can be accurately and precisely known whether or not the file is in a consistent state.

According to an embodiment of the system 200, on request from the computing system 302 to recover a file to a state, the CDP appliance 306 is configured for: searching the continuous catalog 312 for a PIT the file has the state, rolling the journal 308 back to the PIT, mounting the file system in the secondary volume 310 at the PIT, retrieving from the secondary volume 310 the state of the file at the PIT, and restoring the file to the state in the primary volume 304.

In this regard, the CDP appliance 306 is configured to recover the file to the state at any PIT when a user of the computing system 302 initiates a request. When the CDP appliance 306 is configured to mount the file system, in the secondary volume 310, the file system is attached to the secondary volume 310 at the PIT and makes the secondary volume 310 available for retrieving the state of the file at the PIT.

According to an embodiment of the system 200, the primary volume 304 is located in a primary storage 316 while the journal 308, the continuous catalog 312 and the secondary volume 310 are located in a secondary storage 318. In this regard, the primary volume 304 is located on-site (physically near the computing system 302), and the secondary volume (as a remote storage) 310 is located off-site (physically distant the computing system 302). In such a case, a remote replication of data is optionally performed, by the CDP appliance 306 (when being implemented as the remote CDP appliance) for the secondary volume 310.

According to an embodiment of the system 200, the primary volume 304, the journal 308, the continuous catalog 312, and the secondary volume 310 are located in the same. In this regard, the primary volume 304, the journal 308, the continuous catalog 312, and the secondary volume 310 share a common storage. In such a case, a local replication of data is optionally performed, by the CDP appliance 306 (when being implemented as the local CDP appliance) for the secondary volume 310. The CDP appliance may also be located on the same site.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the application, which are, for brevity, described in the context of a single embodiment, may also be provided separately or in any suitable combination or as suitable in any other described embodiment of the disclosure.

What is claimed is:

1. A method of continuous data protection (CDP), comprising:
   sending, by a splitter, block I/O write data from a computing system to a primary volume and to a CDP appliance;
   recording, by a file system tracker communicatively coupled with the splitter, a log of meta data operations made to files in a file system of the primary volume and sending the log to the CDP appliance; and
   recording, by the CDP appliance, the block I/O write data in a journal and a secondary volume, and recording the log of meta data operations made to files in the file system of the primary volume in a continuous catalog,
   wherein the continuous catalog is searchable, based on a name and attributes of a respective file, for a state of the respective file at a point in time (PIT), wherein the state of the respective file at the PIT is defined by what operations have been made to the file by the PIT.

2. The method of claim 1, wherein the log of meta data operations made to files in the file system of the primary volume comprises a list of files exposed to operations and a log of meta data operations made to each file in the list.

3. The method of claim 1, further comprising:
   cleaning the log of meta data operations made to files in the file system of the primary volume in the file system tracker each time after sending the log of meta data operations made to files in the file system of the primary volume to the CDP appliance.

4. The method of claim 1, further comprising:
   searching, by the CDP appliance on request from the computing system, to recover a file to a state, wherein the continuous catalog for a PIT of the file has the state;
   rolling the journal back to the PIT, mounting the file system in the secondary volume at the PIT and retrieving from the secondary volume the state of the file at the PIT; and
   restoring the file to the state in the primary volume.

5. The method of claim 1, wherein the primary volume is located in a primary storage while the journal, the continuous catalog, and the secondary volume are located in a secondary storage.

6. The method of claim 1, wherein the primary volume, the journal, the continuous catalog, and the secondary volume are located in the same storage.

7. A system for continuous data protection (CDP), comprising:
   a splitter configured to send block I/O write data from a computing system to a primary volume and to a CDP appliance; and
   a file system tracker communicatively coupled with the splitter and configured to record a log of meta data operations made to files in a file system of the primary volume and sending the log to the CDP appliance; and
   the CDP appliance configured for recording the block I/O write data in a journal and a secondary volume, and recording the log of meta data operations made to files in the file system of the primary volume in a continuous catalog,
   wherein the continuous catalog is searchable, based on a name and attributes of a respective file, for a state of the respective file at a point in time (PIT), wherein the state of the respective file at the PIT is defined by what operations have been made to the file by the PIT.

8. The system of claim 7, wherein the log of meta data operations made to files in the file system of the primary volume comprises a list of files exposed to operations and a log of meta data operations made to each file in the list.

9. The system of claim 7, wherein the file system tracker is further configured to clean the log of meta data operations made to files in the file system of the primary volume each time after sending the log of meta data operations made to files in the file system of the primary volume to the CDP appliance.

10. The system of claim 7, wherein on a request from the computing system to recover a file to a state, the CDP appliance is further configured to:
    search the continuous catalog for a PIT the file has the state;
    roll the journal back to the PIT;
    mount the file system in the secondary volume at the PIT;
    retrieve from the secondary volume the state of the file at the PIT; and
    restore the file to the state in the primary volume.

11. The system of claim 7, wherein the primary volume is located in a primary storage while the journal, the continuous catalog, and the secondary volume are located in a secondary storage.

12. The system of claim 7, wherein the primary volume, the journal, the continuous catalog, and the secondary volume are located in the same storage.

* * * * *